United States Patent
O'Shaughnessy

[19]

[11] Patent Number: 5,978,778
[45] Date of Patent: Nov. 2, 1999

[54] AUTOMATED STRATEGIES FOR INVESTMENT MANAGEMENT

[76] Inventor: James P. O'Shaughnessy, 35 Mason St., Greenwich, Conn. 06830

[21] Appl. No.: 08/995,296

[22] Filed: Dec. 20, 1997

Related U.S. Application Data

[60] Provisional application No. 60/034,089, Dec. 30, 1996.
[51] Int. Cl.⁶ .................................................. B42D 15/00
[52] U.S. Cl. ............................... 705/36; 705/35; 705/37
[58] Field of Search ................................. 705/35, 36, 37, 705/44

[56] References Cited

U.S. PATENT DOCUMENTS

5,297,032  3/1994  Trojan et al. .............................. 705/37

*Primary Examiner*—Thomas R. Peeso
*Attorney, Agent, or Firm*—Gerry J. Elman; Brian P. Canniff

[57] ABSTRACT

The invention is in the field of using a computer to select corporate stocks for investment. Fifty stocks are selected from a database on the basis of certain criteria. The stocks are acquired in equal proportions, and the portfolio is rebalanced at the end of an annual term. A method of the present invention uses either a growth strategy, a value strategy, or both strategies. Growth Model 3 strategy selects the stocks with the best 1-year price performance from All Stocks (stocks with market capitalization more than $150 million) with earnings gains for five consecutive years that also have price-to-sales ratios below 1.5. Value Model 3 strategy selects market leading stocks with the highest dividend yields (excluding utilities so they do not dominate the list). Market leading stocks come from the Large Stocks Universe and have: more common shares outstanding than the average stock in the database, cashflows per share exceeding the database mean, and corporate sales that are 1.5 times the database mean. A stock portfolio may be constructed which uses both Growth Model 3 and Value Model 3 in chosen proportion to one another. At the end of an annual term, the amount of money generated by the two strategies is pooled and then re-invested in accordance with the chosen proportion (which may change over time).

20 Claims, 2 Drawing Sheets

AUTOMATED STRATEGIES FOR INVESTMENT MANAGEMENT

CROSS REFERENCE TO RELATED APPLICATION

Applicant hereby claims priority under 35 U.S.C. § 119(e) from the following Provisional U.S. Patent Application Serial No. 60/034,089, filed Dec. 30, 1996, which is incorporated herein by reference.

FIELD OF THE INVENTION

The invention is in the field of using a computer to select corporate stocks for investment.

BACKGROUND OF THE INVENTION

Knowing how a particular investment strategy performed historically gives one the vital information one needs on its risk, variability, and persistence of returns. Before the commencement of the inventor's work, there was no widely available comprehensive guide to which strategies are long-term winners and which are not. The inventor had access to the historical S&P Compustat database of United States stock market information: forty-three years of results for Wall Street's most popular investment strategies.

It took the combination of fast computers and huge databases to prove that a portfolio's returns are essentially determined by the factors that define the portfolio. Before computers, it was almost impossible to determine what strategy guided the development of a portfolio. The number of underlying factors (e.g. price-to-earnings ratio, dividend yield) that an investor could consider seemed endless. The best one could do was look at portfolios in the most general ways. With computers, one can also test combinations of factors over long periods of time, showing what one can expect in the future from any given investment strategy.

History shows that traditional active management does not work. The majority of actively managed funds do not beat the S&P 500. Passive index fund managers have seen their assets rise as a result, from $10 billion in 1980 to over $250 billion in 1990.

There is no product similar to or the same as the method or apparatus of the present invention. Since the magnitude of the sums involved and the complexity of the relevant investment information, it is very desirable to use an objective rule-based strategy and system for automating, to the extent practicable, the conduct of this decision-making.

SUMMARY OF THE INVENTION

The data presented by the inventor proves that the market clearly and consistently rewards certain attributes (e.g., stocks with low price-to-sales ratios) and clearly and consistently punishes others (e.g. stocks with high price-to-sales ratios) over long periods of time. A paradox remains: tests show high return predictability, but 80 percent of traditionally managed mutual funds fail to beat the S&P 500. Models beat human forecasters because they reliably and consistently apply the same criteria time after time.

Stock market decisions and portfolio constructions are served by a methodical scientific method. Certain rules help in this process. First, all models must use explicitly stated rules without ambiguity or allowance for a private or unique interpretation of the rule. Second, the rule must be stated explicitly and publicly so anyone with the time, money, data, equipment and inclination can reproduce the results. Third, someone using the same rules and the same reliable database must get the same results. Fourth, the results must be consistent over time; long-term results cannot owe all their benefits to a few years. Fifth, the rule must be intuitive and logical and not be derived from the data.

The inventor used the S&P Compustat Active and Research Database from 1950 through 1994. The inventor used certain methods to evaluate how different rules for constructing portfolios worked over these periods. Certain choices were made regarding size of the portfolio (50 stocks for most strategies), market capitalization (generally, requiring a minimum of $150 million), and annual rebalancing.

Size of the portfolio. As evaluated, stock portfolios contain 50 stocks. Researchers J. L. Evans and S. H. Archer found most of the benefits of diversification come from as few as 16 stocks. One wants to avoid holding too many or too few stocks. Larger or smaller portfolios are within the scope of the inventor's invention.

Market Capitalization. The inventor primarily studied two groups. The first stock group includes only stocks with a market capitalization in excess of $150 million (adjusted for inflation); it is called All Stocks throughout this application. The inventor chose $150 million after consulting a trader at a large Wall Street brokerage who felt it was the minimum necessary if he was investing $100 million in 50 stocks in 1995. This figure avoids focusing on tiny stocks and focuses only on those stocks which a professional investor could by without running into liquidity problems. A stock with a market capitalization of $27 million in 1950 is the equivalent of a $150 million stock at the end of 1994. The second stock group includes larger, better-known stocks with market capitalizations greater than the database average (usually the top 16 percent of the database by market capitalization); it is called Large Stocks throughout the application.

Annual Rebalancing. The portfolios studied are constructed and rebalanced annually. Stocks are equally weighted with no adjustment for other variables. For example, if $1,000,000 is invested in 50 stocks, a $20,000 investment is made in each stock. Dividends are re-invested in proportion with the original proportions. At the end of the year, all of the stocks may be sold and replaced with another fifty stocks that meet the criteria of the strategy. Throughout the application, rebalancing refers to this process. Of course, for tax purposes, an investor must be careful in rebalancing that one does not unnecessarily sell and reacquire shares of stock in an existing portfolio when performing the rebalancing. A year was chosen since it is long enough to minimize effects of commissions and costs of rebalancing the portfolio. A term as long as two years or as short as three months could be used as the period after which one rebalances the portfolio in accordance with some embodiments of the present invention.

Sharpe Ratios. The inventor uses the well-known Sharpe ratio of reward to risk, with higher numbers indicating better risk-adjusted returns. To arrive at the Sharpe ratio, take the average return from a strategy, subtract the risk-free rate of interest, and then divide that number by the standard deviation of return.

TABLE 1

|         | Average | Standard Deviation |
|---------|---------|--------------------|
| S&P 500 | 14.25%  | 12.01%             |
| T-Bills | 6.15%   | 2.07%              |
| S&P 500 | 8.10%   | 11.68%             |

TABLE 1-continued

|  | Average | Standard Deviation |
| --- | --- | --- |
| Minus T Strategy | 19.06% | 24.37% |
| T-Bills | 6.15% | 2.07% |
| Strategy Minus T | 12.91% | 24.75% |

The risk-adjust return for the S&P 500 equals 8.10% divided by 12.01% or 67.44. The risk-adjust return for the strategy equals 12.91% divided by 24.37% or 52.97.

Market Capitalization Matters. A comparison of All Stocks (stocks with a market capitalization of more than $150 million) and Large Stocks (stocks with a market capitalization higher than the database average) reveals that size matters. All Stocks outperformed Large Stocks.

For purposes of simplicity in this application, the yield of a $10,000 investment over the 43 years (or the 40 years for those strategies using 5-year factors) in millions and the resultant Sharpe Ratio is presented. The portfolio is rebalanced annually. Stocks are equally weighted, all dividends are reinvested, and all variables such as common shares outstanding are time-lagged to avoid look-ahead bias. For those interested in viewing more of the underlying data, the inventor suggests that the reader consult his commercially available book, *What Works on Wall Street* (Author, James P. O'Shaughnessy. Published by McGraw-Hill, 1997).

A more detailed analysis of how capitalization affects stocks' performance follows (in millions ($1M), from an initial investment of $10,000 invested over 43 years) in Table 2.

TABLE 2

| Category | $1 M's | Sharpe Ratio |
| --- | --- | --- |
| All Stocks | 1.80 | 47 |
| Large stocks | 1.00 | 45 |
| S&P 500 | 1.00 | 44 |
| Cap < $1 b | .80 | 40 |
| 500 M < cap < $1 b | .75 | 39 |
| 250 M < cap < 500 M | 1.30 | 45 |
| $100 M < cap < $250 M | 1.30 | 42 |
| $25 M < cap < $100 M | 1.70 | 41 |
| Cap < $25 M | 29.10 | 57 |

Although, small cap stocks have been favored in many studies, All Stocks outperforms small caps. A great deal of the benefit of small cap stocks comes from stocks in the microcap (capitalization less than $25 million) range. The stocks are too small for mutual fund to buy and far too numerous for an individual to tackle. Large Stocks performed in a similar fashion to the S&P 500, with slightly better risk and almost equivalent yield.

Computer. The present invention may be utilized on a general purpose computer, such an IBM PC, VAX, Mac or other computer known to those in the art. Additionally, the sorting, filtering, and criteria could be encoded onto special purpose chips for creating special purpose hardware for carrying out the present invention. The present invention could be implemented on a wide area network, local area network, through a dial-up connection to a dedicated machine, through an internet or intranet connection.

Value Factors include the following: low price-to-earnings (PE) ratios; low price-to-book ratios; low price-to-cashflow ratios; low price-to-sales ratios; dividend yields.

Price-to-Earnings Ratios. For many on Wall Street, buying stock with low price-to-earnings (PE) ratios is a favored indicator. One finds a stock's current PE ratios by dividing the price by the current earnings per share. The higher the PE, the more investors are paying for earnings, and the larger the implied expectations for future earnings growth. A stock's PE ratio is one of the most common measurements of how cheap or expensive it is relative to other stocks.

$10,000 is invested on Dec. 31, 1951 in the 50 stocks with the lowest price-to-earnings ratios. The portfolio is rebalanced each year to hold the 50 stocks with the lowest PE ratios in any given year. For the yield, and risk-adjusted yield, see Table 3.

Note that Large Stocks with Low PE outperformed Large Stocks and had a better Sharpe ratio, while Low PE All Stocks suffered a worse return and with worse risk. Small companies can have a string of spectacular earnings gains on their way to becoming large companies. It's sensible for investors to award them with higher PE ratios. Since low PE ratios indicate lower investor expectations for earnings growth, a small company with a low PE ratio might have very limited prospects. High PE Ratios are dangerous. Both All Stocks and Large Stocks outperform the High PE All Stocks and the High PE Large Stocks.

TABLE 3

| Category | $1 M's | Sharpe Ratio |
| --- | --- | --- |
| Low PE All Stocks | 1.23 | 37 |
| Low PE Large stocks | 2.29 | 47 |
| High PE All Stocks | .39 | 25 |
| High PE Large stocks | .47 | 29 |

Price-to-book ratios (P/C). Find price-to-book by dividing the current price of the stock by the book value per share. Over the long term, the market rewards stocks with low price-to-book ratios and punishes those with high ones. See Table 4.

TABLE 4

| Category | $1 M's | Sharpe Ratio |
| --- | --- | --- |
| Low P/B All Stocks | 3.59 | 47 |
| Low P/B Large stocks | 3.42 | 54 |
| High P/B All Stocks | .29 | 23 |
| High P/B Large stocks | .56 | 30 |

Price-to-cashflow (P/C). Price-to-cashflow is yet another measure of whether a stock is cheap or not. Find cashflow by adding income (before extraordinary items) to depreciation and amortization. The price-to-cashflow ratio is the market value of the stock divided by total cashflow. See Table 5.

TABLE 5

| Category | $1 M's | Sharpe Ratio |
| --- | --- | --- |
| Low P/C All Stocks | 2.95 | 45 |
| Low P/C Large stocks | 3.62 | 53 |
| High P/C All Stocks | .21 | 20 |
| High P/C Large stocks | .55 | 30 |

Price-to-Sales (PSR). Price-to-Sales Ratios is a good measure. The price of the company is measured against annual sales (instead of earnings). Investors who buy low PSR stocks buy them because they believe they're getting a bargain. See Table 6.

TABLE 6

| Category | $1 M's | Sharpe Ratio |
| --- | --- | --- |
| Low PSR All Stocks | 5.93 | 52 |
| Low PSR Large stocks | 2.55 | 49 |
| High PSR All Stocks | .07 | 11 |
| High PSR Large stocks | .41 | 27 |

Dividend yields. Find a stock's dividend yield by dividing the indicated annual dividend rate by the current price of the stock. The result is then multiplied by 100 to make it a percentage. Thus if a company pays an annual dividend of $1, and the current price of the stock is $10, the dividend is 10 percent. See Table 7.

TABLE 7

High Yielding Dividends (excluding utilities)

| Category | $1 M's | Sharpe Ratio |
| --- | --- | --- |
| All Stocks | 1.11 | 39 |
| Large stocks | 2.01 | 51 |

The returns of the high yielding large stocks are entirely different from their universe with virtually the same risk. The 50 highest-yielding stocks beat the universe 91 percent of the time over all rolling 10-year periods. Investors who buy higher yielding stocks should stick to large, better-known companies, which usually have the stronger balance sheets and longer operating histories that make higher dividends possible. Small stocks with high dividend yields may be in that position because their prices have fallen. Far from representing a bargain, their high dividend yields may be an indicator of more trouble to come.

Value Strategy Implications. The forty-three years of data show that the stock market methodically rewards certain types of stocks while punishing others. Stocks with low price-to-book, price-to-cashflow, and price-to-sales ratios dramatically outperform the All Stocks universe. Just as importantly, those with high price-to-book, price-to-cashflow, and price-to-sales ratios do dramatically worse. Stocks with low price-to-earnings ratios and those with high dividend yields fail to beat All Stocks. Buying the 50 stocks with the lowest price-to-sales ratios was the only strategy that beat the All Stocks universe on a risk-adjusted basis. The other value strategies came close, with the low price-to-book group matching All Stocks' Sharpe ratio of 47, and the low price-to-cashflow group close behind with a Sharpe ratio of 45. All the Large Stocks value strategies beat the Large Stocks universe on an absolute and risk-adjusted basis, and they did so at least 88 percent of the time over all rolling 10-year periods.

Growth investors want high earnings and sales growth with prospects of more of the same. They usually are not concerned if stock has a high PE ratio, reasoning that a company can grow its way out of short-term overvaluations. Growth investors often award high prices to stocks with rapidly increasing earnings.

One-Year-Earnings-Per-Share Percentage Changes. One-year-earnings-per-share percentage changes are a poor lone factor upon which to base investment decisions. See Table 8.

TABLE 8

1-year earnings-per-share percentage changes

| Category | $1 M's | Sharpe Ratio |
| --- | --- | --- |
| Best All Stocks | .91 | 34 |
| Best Large stocks | .39 | 28 |
| Worst All Stocks | 1.13 | 38 |
| Worst Large stocks | 1.12 | 43 |

The implication is that buying stocks simply because they have great earnings gains is a losing proposition. Stocks with the highest 1-year earnings gains almost always have the highest prince-to-earnings ratios, another indicator that poor performance lies ahead. While their returns are slightly higher than those with the best earning changes, there is no compelling theory to justify buying stocks with the worst earnings changes.

Best 5-year earnings gains. Some analysts believe that a 1-year change in earnings is meaningless and that one should focus on 5-year growth rates. Using 5-year earnings gains as the only determinate will lead to disappointing results. See Table 9.

TABLE 9

| Category | $1 M's | Sharpe Ratio |
| --- | --- | --- |
| Best 5-year earnings gains All Stocks | .35 | 26 |
| Best 5-year earnings gains Large stocks | .37 | 28 |

Net profit margins are an excellent gauge of a company's operating efficiency and ability to compete successfully with other firms in its field. Thus many believe that firms with high profit margins are better investments, since they are the leaders in their industries. One finds net profit margins by dividing income before extraordinary items (A company's income after all expenses but before provisions for dividends) by net sales. This is then multiplied by 100 to get a percentage. See Table 10. History shows using high profit margins as the only determinate in buying a stock will lead to disappointing results.

TABLE 10

| Category | $1 M's | Sharpe Ratio |
| --- | --- | --- |
| Best profit margins All Stocks | .74 | 34 |
| Best profit margins Large stocks | .75 | 40 |

High return on equity (ROE) is a hallmark of a growth stock. One finds return on equity by dividing common stock equity into income before extraordinary items (a company's income after all expenses but before provisions for dividends). One then multiplies them by 100 to express the term as a percentage. Here is used common liquidating equity (called CEQL in Compustat) as a proxy for common equity.

As with high profit margins, many believe that a high return on equity (ROE) is an excellent gauge of how effectively a company invests shareholders' money. The higher the ROE, the better the company's ability to invest one's money, and presumably, the better an investment the stock will be. See Table 11.

TABLE 11

| Category | $1 M's | Sharpe Ratio |
|---|---|---|
| Best ROE All Stocks | .35 | 26 |
| Best ROE Large stocks | .37 | 28 |

ROE provides an excellent example of the importance of looking at the long-term when judging a strategy's effectiveness. An investor just out of college at the end of 1964 studying how stocks with high return on equity perform find encouraging evidence. The 50 highest ROE stocks from both the All and Large Stocks universe outperformed their respective benchmarks in the previous decade. Over the longer period, however, ROE was a poor sole performance indicator.

Relative Price Strength. Using strong price momentum as a determinate runs counter to efficient market theories. One cannot use past prices to predict future prices, according to efficient market theory. Conversely, another school of thought says one should buy stocks that have been most battered by the market. In this application, relative strength and price performers will be used interchangeably. See Table 12 for comparison of 1-year relative strength changes.

TABLE 12

1-year relative strength

| Category | $1 M's | Sharpe Ratio |
|---|---|---|
| Best All Stocks | 3.31 | 43 |
| Best Large stocks | 2.98 | 49 |
| Worst All Stocks | .03 | 3 |
| Worst Large stocks | .49 | 29 |

While All Stocks Best 1-year relative strength had an impressive yield, it had a high standard deviation and therefore high risk that brought the Sharpe ratio to 43, under the All Stocks universe's 47. Large Stocks Best 1-year relative strength had an impressive yield with slightly more risk than the Large Stocks universe: the resultant 49 Sharpe ratio is higher than the Large Stocks universe's 45.

Price momentum conveys different information about the prospects of a stock and is a much better indicator than factors such as earnings and growth rates. Worst 1-year price performance is dramatically outperformed by the market. See Table 12.

Instead of focussing on the effects of either a single growth or value factor, using several factors allows one to enhance performance or reduce risk, depending on one's goal.

From All Stocks with a PE ratio below 20, take the 50 stocks with the best 1 year price appreciation. Or from All Stocks with a price-to-book ratio below 1, take the 50 stocks with the best 1 year price appreciation. Either multi-factor analysis outperforms All Stocks, and outperforms either of the factors that comprise it (i.e. low PE ratio or best price appreciation). See Table 13.

TABLE 13

| Category | $1 M's | Sharpe Ratio |
|---|---|---|
| 50 Stocks with PE ratios below 20 and best 1 year price appreciation | 8.6 | 55 |
| 50 stocks with price-to-book ratio below 1 and best 1 year price appreciation | 10.6 | 61 |

TABLE 13-continued

| Category | $1 M's | Sharpe Ratio |
|---|---|---|
| All Stocks PSR < 1 Top 50 1-year price Appreciation | 14.1 | 62 |
| All Stocks | 1.7 | 47 |
| Large Stocks PSR < 1 Top 50 1-year price Appreciation | 3.6 | 57 |
| Large Stocks | 1.0 | 45 |

Price to sales ratio also performs well when joined with relative strength. In this model, Price to Sales ratio is less than 1. And then stocks are selected by top 1-year price appreciation. The return on All Stocks was higher than the return on Large Stocks. See Table 13.

However, just cumulating additional factors does not increase the performance: if one took Large Stocks with PE ratios below 20 and positive earnings gains for the year and bought the 50 with the best 1-year price performance, one would actually earn less than if one bought the low PE, high relative strength stocks alone. The addition of positive earnings gains hurt performance in this instance. More factors do not necessarily mean better performance.

Buying stocks with strong 1-year earnings gains and strong relative price strength outperforms the All Stocks universe. A two-factor model that requires stocks from All Stocks to have 1-year earnings gains exceeding 25 percent and then buys the 50 with the best 1-year price performance also outperforms the All Stocks universe. See Table 14.

TABLE 14

| Category | $1 M's | Sharpe Ratio |
|---|---|---|
| (all Stocks) 1-year earnings; gains above 25%; Top 50 1-year price Appreciation | 6.3 | 50 |
| (all Stocks) ROE > 15; Top 50 1-year Price appreciation | 9.4 | 55 |
| All Stocks | 1.7 | 47 |
| (Large Stocks) ROE > 15; Top 50 1-year Price appreciation | 2.3 | 45 |

This model was not able to be tested in the Large Stocks universe because in many years fewer than 50 Large Stocks had earnings gains above 25%. Other growth variable work better. Buying the 50 stocks from the All Stocks universe with the best ROE didn't beat the market, but adding a high ROE factor to a relative strength model enhanced returns even more than the earnings gains model. See Table 14. For large stocks, results were less striking: higher yield was compensated by higher risk to yield the same Sharpe ratio for the strategy v. the Large Stock universe. See Table 14. Buying the lower price-to-sales stocks from All Stocks is the best performing single value factor.

"Value Model 1"
1. Price to book ratios below 1.5
2. Dividend yield must exceed the Compustat average for any given year. This effectively limits one to the upper 20 percent of the database by dividend yield.
3. Price-to-earnings ratios are below the Compustat database average for any given year.
4. Price-to-cashflow ratios are the lowest in the All Socks universe.

See Table 14.

While the yield of Value Model 1 was not as high as Low price-to-sales, the risk was lower, and the result a higher Sharpe ratio for Value Model 1.

The choice of several of the right factors can reduce risk while maintaining similar returns.

Value Model 2 Uses Low Price-to-Sales Ratios as its Final Factor:
1. Dividend yields must exceed Compustat mean.
2. The stock's price change in the previous year must be positive (Find this by dividing the current year's price by the preceding year's price so the result is greater than 1). This guarantees that none of the stocks' prices decreased in the previous year.
3. The stocks have the lowest price-to-sales ratios in the All Socks universe.

See Table 15.

TABLE 15

| Category | $1 M's | Sharpe Ratio |
| --- | --- | --- |
| Value Model 1 | 5.5 | 53 |
| Low Price-to-sales | 5.9 | 52 |
| Value Model 2 | 7.6 | 59 |
| Value Model 3: Market leaders; Top 50 dividend yield | 4.1 | 63 |

History shows that a portfolio of market-leading stocks that possess attractive value ratios, particularly those with high dividend yields, consistently beat the market at similar levels of risk. A market leading company is a large, well-known company with sales well above the average. It usually also has strong cashflows and large numbers of shares available to the public. These market leading firms are considerably less volatile than the market as a whole. While high dividend yields alone do not add value to stocks from the All Stocks universe, when combined with large market-leading firms they improve performance dramatically at risk levels that are virtually the same as the market.
Market Leading Stocks:
1. come from the Large Stocks Universe;
2. have more common shares outstanding than the average stock in the Compustat database;
3. Cashflows per share exceed the Compustat mean;
4. Sales are 1.5 times the Compustat mean;
5. utilities are eliminated so they don't dominate the list.

High PE ratios pulled down even the market's leaders, while low PE ratios help. High yield works better still: yielding $4.1M and a Sharpe ratio of 63 due to the extremely low volatility.

The most extraordinary thing about this high-yield strategy is that the worst it ever did was a loss of 15 percent. That's nearly half Large Stocks largest annual loss of 26.7 percent. This strategy outperformed Large Stocks in 8 of the 11 bear market years, and never had a negative 5-year return. It had only one 10-year period in which it failed to beat Large Stocks, then losing to the group only by a miniscule 0.78 percent.

This strategy beat Large Stocks in 9 of the 13 years in which the market gains exceeded 25 percent Indeed, in the super bull years of 1954, 1958, and 1975, when Large Stocks gained 40 percent or more, the strategy always did better. This implies that large well-known market-leading companies are much better investments when they have a value characteristic like low PE ratio or low price-to-cashflow ratio, but the best criterion is dividend yield.

The returns from buying the 50 market-leading stocks with the highest dividend yields are so outstanding that this Value Model 3 should serve as a Cornerstone Value Strategy for all portfolios. The reasons are numerous. The strategy sticks to large well-known companies, yet does four times as well as the Large Stocks universe while taking virtually the same risk. It has the highest risk-adjusted return of all strategies examined. The biggest projected loss is 18.17 percent, lower than the Large Stocks' worse projected loss of 19.73 percent. The maximum projected gain for the strategy is 50.82 percent compared with Large Stocks' 44.97 percent. The strategy does better than Large Stocks in bull and bear markets, leading the market in most bull years and providing a cushion in bear years.

Finally, the strategy's high returns coupled with low risk and persistence of returns make it a natural replacement for investors indexing their portfolios to the S&P 500 or other Large Stocks style indexes. See Table 15.

A Cornerstone Growth should complement the Cornerstone Value (Value Model 3) strategy: a high risk-adjusted return to justify the increased volatility.
Growth Model 1
All stocks universe
5-year earnings-per-share growth rates exceeding the Compustat mean
Profit margins exceeding the Compustat mean
Earning gains 5 years in a row
Buy the 50 stocks with the best 1-year relative strength in the All Stocks group
See Table 16.

Growth Model 1 loses out to the strategy which buys low price-to-sales stocks with the best relative strength.

One is better off ignoring 5-year compound earnings growth rates and profit margins exceeding the Compustat mean and focusing exclusively on stocks that show persistent earnings growth without regard to magnitude.
Growth Model 2:
Come from All Stocks
Have earnings gains 5 years in a row
Display the best price performance in the All Stocks group
See Table 16.

Uniting persistence with low price-to-sales results in a strategy that performs slightly better than low price-to-sales alone while reducing risk.
Growth Model 3:
1. All Stocks
2. Earnings gains for 5 consecutive years
3. Price-to-sales ratios below 1.5
4. Display the best 1-year price performance in the All Stocks group.

One increases the price-to-sales minimum to 1.5 to allow more of the 'growth' stocks with persistent earnings gains to make the final cut. See Table 16. Growth strategies are less effective with large stocks; one is much better off using the All Stocks universe when pursuing growth strategies. If one can tolerate higher risk, one can beat the market with a strategy like Gorwth Model 3. It's worth noting that the best growth strategy includes a low price-to-sales requirement, traditionally a value factor. The best time to buy growth stocks is when they are cheap. This strategy will never buy a Netscape or Genetech or Poloroid at 165 times earnings. That why it works so well. It forces one to buy stocks just when the market realizes the companies have been overlooked. That's the advantage of using relative strength as the final factor. It gets one to buy just as the market is embracing the stocks, while the price-to-sales constraint ensures that they are still reasonably priced. Indeed the evidence shows that all the most successful strategies include at least one value factor, keeping investors from paying too much for a stock.

The most effective way to diversify a portfolio and enhance risk-adjusted returns is to unite growth and value strategies. Joining growth with value substantially reduces the volatility of growth strategies and increases the capital appreciation potential of less volatile value strategies. It also ensures a diversified portfolio, giving one the chance to perform well regardless of what style is in favor on Wall Street. A $5,000 investment is made in Value Model 3 and Growth Model 3, annually rebalanced gives the following yield. See Table 16.

TABLE 16

| Category | $1 M's | Sharpe Ratio |
|---|---|---|
| Growth Model 1 | 3.9 | 56 |
| All Stocks | 1.0 | 43 |
| 50 with price-to-sales below 1 and best 1-year appreciation | 7.9 | 59 |
| Growth Model 2 | 5.1 | 51 |
| Growth Model 3 | 8.1 | 60 |
| 50/50: Value Model 3; Growth Model 3 | 4.9 | 65 |

(note: some periods end at end of 1994)

This unified strategy yields the highest Sharpe ratio examined in this application. The great yield is accomplished with almost the same risk as All Stocks.

The invention discloses a method for carrying out computerized selection of stocks for an investment portfolio comprising the steps of accessing a database of stock information with a computer; selecting stocks for an investment portfolio based on information in said database meeting certain criteria; wherein said criteria include selecting stocks of companies with database records indicating: (i) market capitalization in excess of a desired capital amount; (ii) price-to-sales ratios lower than a desired amount; and (iii) annual earnings that are higher than the previous year's annual earnings; sorting records identifying the stocks which meet said criteria in descending order of one year appreciation in stock price into a sorted list; and making available from the top of said sorted list a listing of a number of stocks.

The sorted list may be the basis for a human decision to invest. The sorted list may be the basis for a computer to make investment recommendations or generate paper or electronic orders to buy stock or recommendations to buy stock.

In a preferred embodiment, the database is one from the group of Value Line, S&P Compustat, and AAII Stockpac. In another preferred embodiment, a desired capital amount is $150,000,000; price-to-sales ratio is lower than 1.5; and the number of stocks listed is fifty stocks.

Another embodiment of the present invention is a method for carrying out computerized selection of stocks for an investment portfolio comprising the steps of accessing a database of stock information with a computer; selecting stocks for an investment portfolio based on information in said database meeting certain criteria; wherein said criteria includes market leaders with the highest dividend yields; wherein market leaders are stocks of companies that are not utilities and that have (i) a market capitalization in excess of a desired capital amount (ii) more common shares outstanding than the average stock in the database (iii) cashflows per share exceeding the database mean; and (iv) sales that are 1.5 times the database mean; sorting records identifying the stocks which meet said criteria in descending order of one year appreciation in stock price into a sorted list; and sorting records identifying said market leaders in descending order by dividend yield into a sorted list; making available from the top of said sorted list a listing of a number of stocks.

In a preferred embodiment, the database is one from the group of Value Line, S&P Compustat, and AAII Stockpac. In another preferred embodiment, a desired capital amount is $150,000,000; price-to-sales ratio is lower than 1.5; and the number of stocks listed is fifty stocks.

The present invention discloses a method for carrying out computerized selection of stocks for an investment portfolio comprising the steps of selecting stocks for an investment portfolio in accordance with a first strategy; selecting stocks for an investment portfolio in accordance with a second strategy; said first strategy comprising the steps of accessing a database of stock information with a computer; selecting stocks for an investment portfolio based on information in said database meeting certain criteria; wherein said criteria include selecting stocks of companies with database records indicating: market capitalization in excess of a desired capital amount; price-to-sales ratios lower than a desired amount; and annual earnings that are higher than the previous year's annual earnings; sorting the stocks which meet said criteria by the highest one year appreciation in stock price into a sorted list; and making available from the top of said sorted list a first listing of a number of stocks; said second strategy comprising the steps of accessing a database of stock information with a computer; selecting stocks for an investment portfolio based on information in said database meeting certain second criteria; wherein said second criteria includes market leaders with the highest dividend yields; wherein market leaders are stocks of companies having a market capitalization in excess of a desired capital amount; wherein market leaders are stocks of companies having more common shares outstanding than the average stock in the database; wherein market leaders are stocks of companies with cashflows per share exceeding the database mean; market leaders are stocks of companies with sales that are 1.5 times the database mean; wherein market leaders exclude stocks of utility companies; sorting said market leaders by highest dividend yield into a second sorted list; making available from the top of said second sorted list a second listing of a second number of stocks.

In one embodiment, one purchases stocks in accordance with said first strategy and said second strategy. The amounts purchased may be equal or different.

The present invention discloses a method for carrying out computerized selection of stocks for an investment portfolio comprising the steps of accessing a database of stock information with a computer; selecting stocks for an investment portfolio based on information in said database in accordance with a first strategy; and selecting stocks for an investment portfolio based on information in said database in accordance with a second strategy; wherein said first strategy selects a desired number of stocks with the highest one year stock appreciation in price that also meet a first criteria; wherein a first criteria includes selecting stocks of companies having a market capitalization in excess of $150,000,000; wherein said first criteria further includes stocks of companies having price-to-sales ratios lower than 1.5; and wherein said first criteria further includes stocks of companies having annual earnings that are higher than the previous year's annual earnings; wherein said second strategy selects a desired number of stocks with the highest dividend yields that also are market leaders; wherein market leaders are stocks of companies having a market capitalization in excess of a desired capital amount; wherein market leaders are stocks of companies having more common shares outstanding than the average stock in the database; wherein market leaders are stocks of companies with cashflows per share exceeding the database mean; market leaders are stocks of companies with sales that are 1.5 times the database mean; wherein market leaders exclude stocks of utility companies; making available a first listing of a first number of stocks meeting said first criteria; making available a second listing of a second number of stocks meeting said second criteria.

In a preferred embodiment, one can purchase a first set of first number stocks from said first listing and purchase a second set of second number stocks from said second listing, retaining all stocks in both of said sets of stocks for a period of one year and then liquidating and rebalancing the portfolio at the end of the period. It is preferred that both the first number and the second number of stocks purchased is fifty.

A computer programmed to carry out the steps of the various selection methods disclosed. The present invention contemplates a computer-readable medium having imprinted thereon a computer program containing instruction steps such that upon installation of said computer program in a general purpose computer the methods of the present application could be performed.

DESCRIPTION OF A PREFERRED EMBODIMENT

A preferred embodiment unites Value Model 3 and Growth Model 3 in equal proportions to make the best of bear and bull markets. Equal investments are made in accordance with Value Model 3 and Growth Model 3. On an annual basis, the proceeds from investments are pooled and once again equal investments are made in accordance with Value Model 3 and Growth Model 3. For example, if at the end of one year, Value Model 3 stocks are worth 300,000, and Growth Model 3 stocks are worth 400,000, the proceeds are pooled and a re-investment of 350,000 is made in accordance with each of the strategies.

For aggressive investors, the amount of money invested in accordance with Value Model 3 may be less than fifty percent. For some very aggressive investors, the amount of money invested in accordance with Value Model 3 may be zero, and all funds may be invested in accordance with Growth Model 3. Similarly, for more cautious investors, the amount of money invested in accordance with Growth Model 3 may be less than fifty percent. For some very cautious investors, the amount of money invested in accordance with Growth Model 3 may be zero, and all funds may be invested in accordance with Value Model 3.

Also, for particular investors, the proportions of investment may vary between Value Model 3 and Growth Model 3. For example, as people age and near retirement, portfolios may be structured with a stronger Value Model 3 component.

Value Model 3 and Growth Model 3 may each be used individually or as part of a united investment strategy.

Figure 1:
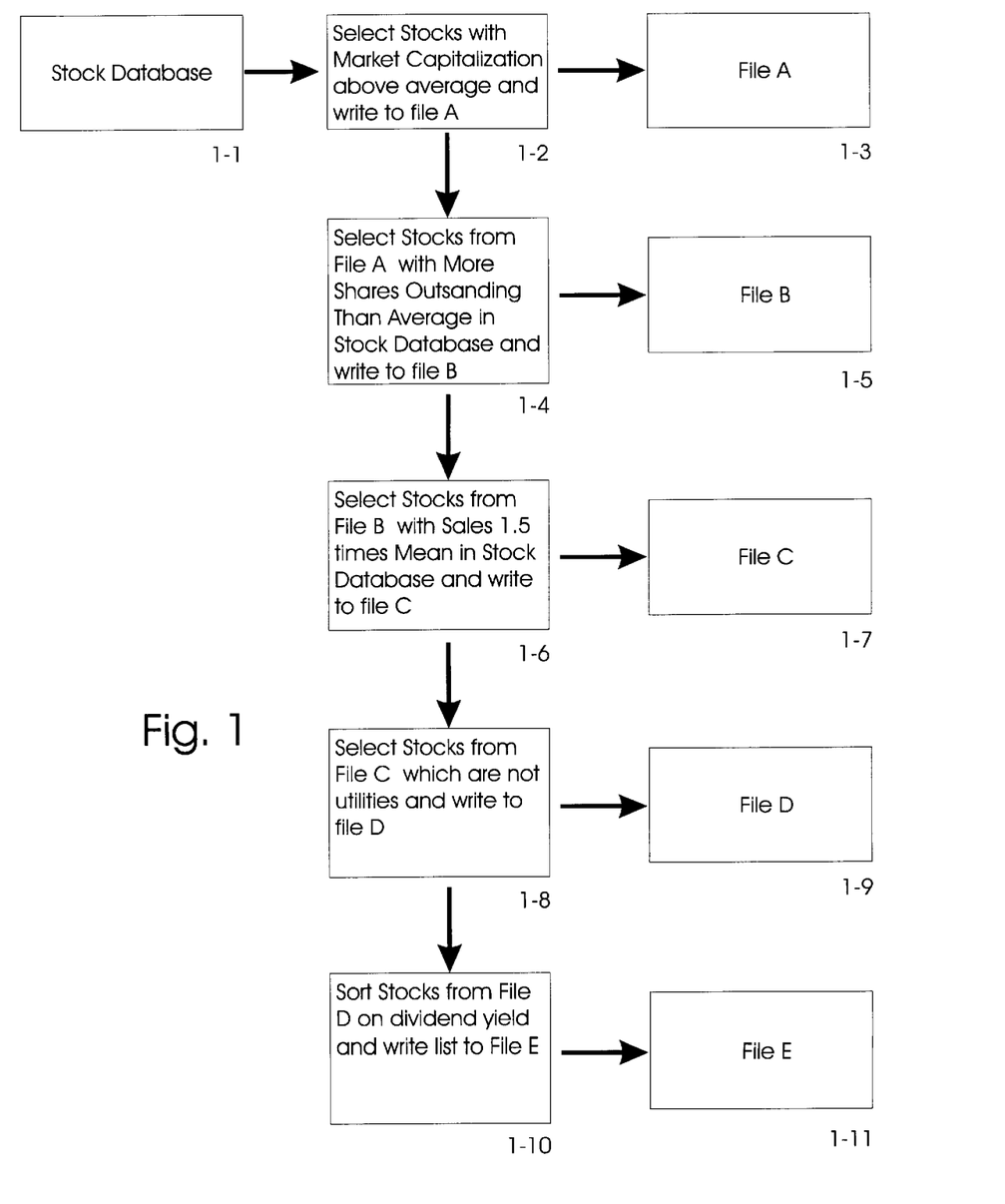
FIG. 1 is a schematic flow chart depicting the selection of stocks for a value strategy of the present invention.

FIG. 1 illustrates the computer manipulation of the Stock Database for the Value Model 3 strategy of the present invention. This Stock Database may be any commonly used database, such as those available from Morningstar or the S&P Compustat Database. The S&P Compustat database is the presently preferred database. The Stock Database (box 1) is screened (box 2) for stocks with a Market Capitalization above average in the Stock Database (box 1). The resultant set in File A (box 3) is further screened (box 4) for stocks with more outstanding shares than average in the Stock Database (box 1). The resultant set of stocks in File B (box 5) is further screened (box 6) for stocks with sales 1.5 times the mean in the Stock Database (box 1). The resultant set in File C (box 7) is further screened (box 8) for stocks which are not utilities. The resultant set in File D (box 9) is sorted (box 10) on dividend yield and written to File E (box 11). Note that the invention may be practiced on a wide variety of scales. Therefore, these numbers, as well as all other quantities listed in the drawing, are provided for purposes of illustration only and are not limiting.

The contents of File E (box 11) is output to a user so the user may then purchase stocks. Alternately, the contents of File E (box 11) provide input to a stock purchasing program.

Also, at File E (box 11) a system consultant, manager, or computer operator is optionally given a chance to manually review the list of investment stocks which were screened by criteria and stored in File E (box 11). The consultant may delete from or re-order the list of File E based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 50 stocks, $20,000 is invested in each stock. The portfolio is held for the appropriate period, re-investing all proceeds in accordance with the original proportions as best as practicable. At the end of the period, the appropriate strategy is then applied as desired.

In a preferred embodiment, fifty stocks are purchased, and the stocks are held for a period of one year. The portfolio is rebalanced at the end of the year in accordance with the desired investment strategy (e.g. applying the same strategy again for another year).

FIG. 1 shows a single method of performing the selection of stocks. Other methods using the same criteria, applied in a logically equivalent but different order are comprehended by this invention. Similarly, applying the criteria simultaneously is logically and functionally equivalent.

Figure 2:
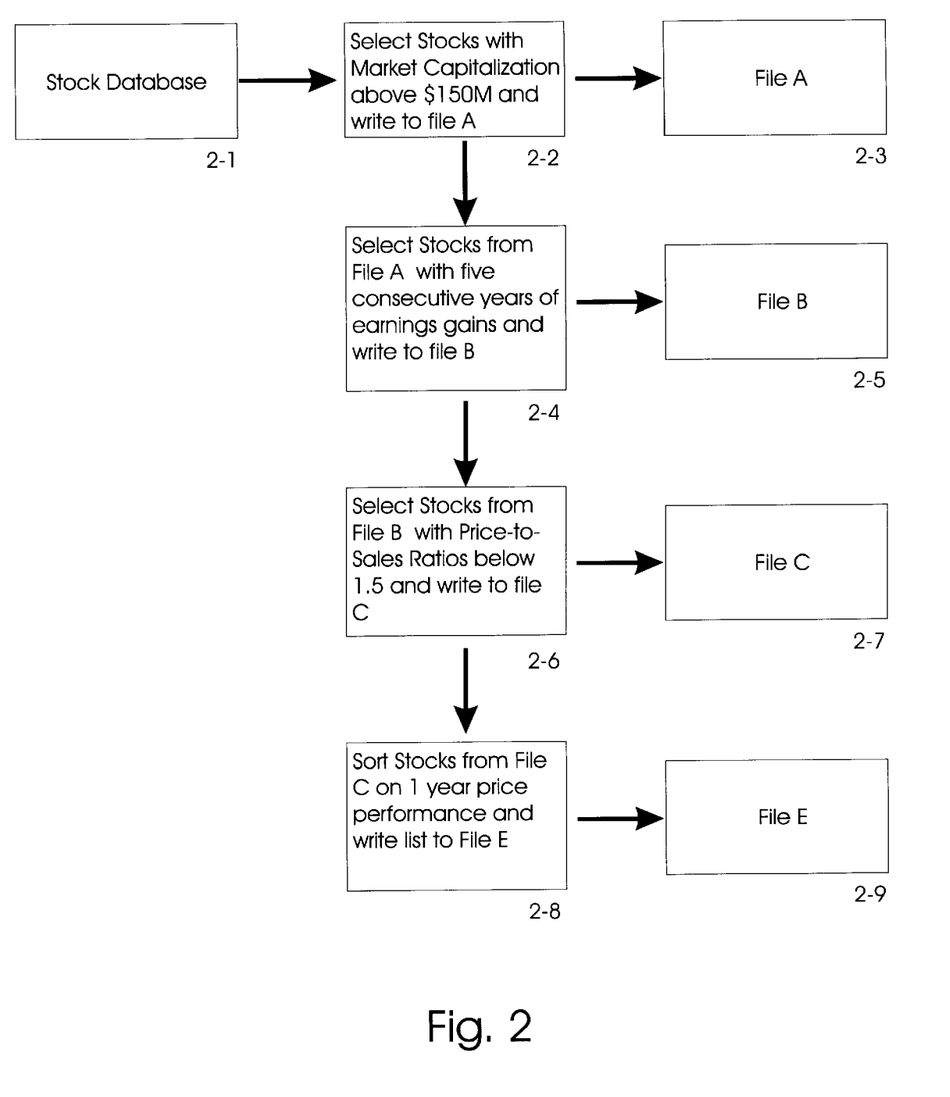
FIG. 2 is a schematic flow chart depicting the selection of stocks for a growth strategy of the present invention.

FIG. 2 illustrates the computer manipulation of the Stock Database for the Growth Model 3 strategy of the present invention. This Stock Database may be any commonly used database, such as those available from Morningstar or the S&P Compustat Database. The S&P Compustat database is the presently preferred database. The Stock Database (box 1) is screened (box 2-2) for stocks with a Market Capitalization above $150M ($150 million). The resultant set in File A (box 2-3) is further screened (box 2-4) for stocks with five consecutive years of earnings gains. The resultant set of stocks in File B (box 2-5) is further screened (box 2-6) for stocks with price-to-sales ratios below 1.5. The resultant set in File C (box 2-7) is sorted (box 2-8) on one year price performance and written to File E (box 2-9). There is no File D in FIG. 2. File E is presented to a user, or used to drive an automated stock purchasing program. Note that the invention may be practiced on a wide variety of scales. Therefore, these numbers, as well as all other quantities listed in the drawing, are provided for purposes of illustration only and are not limiting.

The stocks, meeting certain criteria, and sorted by appropriate criteria, are selected and purchased in an evenly balanced portfolio. The portfolio is held for the appropriate period, re-investing all proceeds in accordance with the original proportions as best as practicable. At the end of the period, the appropriate strategy is then applied as desired. In a preferred embodiment, fifty stocks are purchased, and the stocks are held for a period of one year.

FIG. 2 shows a single method of performing the selection of stocks. Other methods using the same criteria, applied in a logically equivalent but different order are comprehended by this invention. Similarly, applying the criteria simultaneously is logically and functionally equivalent.

While the above provides a full and complete disclosure of the preferred embodiments of this invention, equivalents may be employed without departing from the true spirit and scope of the invention. Such changes might involve alternate databases, processes, criteria, structural arrangement, capacities, sizes, operational features, reports or the like. Therefore the above description and illustrations should not be construed as limiting the scope of the invention which is defined by the appended claims.

I claim:

1. A method for carrying out computerized selection of stocks for an investment portfolio comprising the steps of:
   (a) accessing a database of stock information with a computer;
   (b) selecting stocks for an investment portfolio based on information in said database meeting certain criteria; wherein said criteria include selecting stocks of companies with database records indicating: (i) market capitalization in excess of $150,000,000; (ii) price-to-sales ratios lower than 1.5; and (iii) annual earnings that are higher than the previous year's annual earnings;
   (c) sorting records identifying the stocks which meet said criteria in descending order of one year appreciation in stock price into a sorted list; and
   (d) making available from the top of said sorted list a listing of a number of stocks.

2. A method for carrying out computerizd selection of stocks as in claim 1 wherein the database is one from the group of Value Line, S&P Compustat, and AAII Stockpac.

3. A method for carrying out computerized selection of stocks as in claim 1 wherein the number of stocks listed is fifty stocks.

4. A computer programmed to carry out the steps of claim 1.

5. A computer-readable medium having imprinted therein a computer program containing instruction steps such that upon installation of said computer program in a general purpose computer, the computer is capable of performing the method of claim 1.

6. A method for carrying out computerized selection of stocks for an investment portfolio comprising the steps of:
   (a) accessing a database of stock information with a computer;
   (b) selecting stocks for an investment portfolio based on information in said database meeting certain criteria; wherein said criteria includes market leaders with the highest dividend yields; wherein market leaders are stocks of companies that are not utilities and that have (i) a market capitalization in excess of $150,000,000 (ii) more common shares outstanding than the average stock in the database (iii) cashflows per share exceeding the database mean; and (iv) sales that are 1.5 times the database mean;
   (c) sorting records identifying said market leaders in descending order by dividend yield into a sorted list;
   (d) making available from the top of said sorted list a listing of a number of stocks.

7. A method for carrying out computerized selection of stocks as in claim 6 wherein the database is one from the group of Value Line, S&P Compustat, and AAII Stockpac.

8. A method or carrying out computerized selection of stocks as in claim 6 wherein the number of stocks listed is fifty stocks.

9. A computer programmed to carry out the steps of claim 6.

10. A computer-readable medium having imprinted therein a computer program containing instruction steps such that upon installation of said computer program in a general purpose computer, the computer is capable of performing the method of claim 6.

11. A method for carrying out computerized selection of stocks for an investment portfolio comprising the steps of:
    (a) selecting stocks for an investment portfolio in accordance with a first strategy;
    (b) selecting stocks for an investment portfolio in accordance with a second strategy;
    (c) said first strategy comprising the steps of (c.1) accessing a database of stock information with a computer; (c.2) selecting stocks for an investment portfolio based on information in said database meeting certain criteria; wherein said criteria include selecting stocks of companies with database records indicating: (c.2.a) market capitalization in excess of a desired capital amount; (c.2.b) price-to-sales ratios lower than a desired amount; and (c.2.c) annual earnings that are higher than the previous year's annual earnings; (c.3) sorting the stocks which meet said criteria by the highest one year appreciation in stock price into a sorted list; and (c.4) making available from the top of said sorted list a first listing of a number of stocks;
    (d) said second strategy comprising the steps of (d.1) accessing a database of stock information with a computer; (d.2) selecting stocks for an investment portfolio based on information in said database meeting certain second criteria; wherein said second criteria includes market leaders with the highest dividend yields; wherein market leaders are stocks of companies that are not utilities and that have (i) a market capitalization in excess of a desired capital amount (ii) more common shares outstanding than the average stock in the database (iii) cashflows per share exceeding the database mean and (iv) sales that are 1.5 times the database mean; wherein market leaders exclude stocks of utility companies; (d.3) sorting said market leaders by highest dividend yield into a second sorted list; (d.4) making available from the top of said second sorted list a second listing of a second number of stocks.

12. A method of carrying out a computerized selection of stocks for investment as in claim 11 wherein said method further includes purchasing stocks in accordance with said first strategy and said second strategy.

13. A method of carrying out a computerized selection of stocks for investment as in claim 12:
    (a) purchasing a first set of first number stocks from said first listing investing an equal first amount in each stock;
    (b) purchasing a second set of second number stocks from said second listing investing an equal first amount in each stock;
    (c) said first amount being not less than said second amount.

14. A method of carrying out a computerized selection of stocks for investment as in claim 12:
    (a) purchasing a first set of first number stocks from said first listing investing an equal first amount in each stock;
    (b) purchasing a second set of second number stocks from said second listing investing an equal first amount in each stock;

(c) said first amount being less than said second amount.

15. A method of investing in stocks comprising the steps of
   (a) performing a computerized selection of stocks for investment as in claim 11;
   (b) purchasing a first equal dollar amount of each stock in said first listing, thereby creating a balanced portfolio;
   (c) purchasing a second equal dollar amount of each stock in said second listing, thereby creating a balanced portfolio;
   (d) retaining all of said stocks for a period of one year;
   (e) liquidating and rebalancing the portfolio at the end of said period.

16. A method of rebalancing a portfolio of stocks, wherein
   (a) stocks are purchased in accordance with the steps of claim 15;
   (b) the stocks existing portfolio is compared with the proposed stocks for the new portfolio by the computer;
   (c) generating purchase and sell orders to minimize unnecessary liquidation and reacquisition of stocks in the existing portfolio.

17. A computer programmed to carry out the steps of claim 15.

18. A computer-readable medium having imprinted thereon a computer program containing instruction steps such that upon installation of said computer program in a general purpose computer, the computer is capable of performing the method of claim 15.

19. A computer programmed to carry out the steps of claim 11.

20. A computer-readable medium having imprinted thereon a computer program containing instruction steps such that upon installation of said computer program in a general purpose computer, the computer is capable of performing the method of claim 11.

* * * * *

UNITED STATES PATENT AND TRADEMARK OFFICE
CERTIFICATE OF CORRECTION

PATENT NO. : 5,978,778  
DATED : November 2, 1999  
INVENTOR(S) : James P. O'Shaughnessy It is certified that error appears in the above-identified patent and that said Letters Patent is hereby corrected as shown below:

<u>Column 16,</u>
Line 56, "first" should read -- second --.

Signed and Sealed this

Ninth Day of April, 2002

Attest:

JAMES E. ROGAN
*Attesting Officer*  *Director of the United States Patent and Trademark Office*